C. A. HAGUE.
Sulky Plow.
No. 243,125. Patented June 21, 1881.
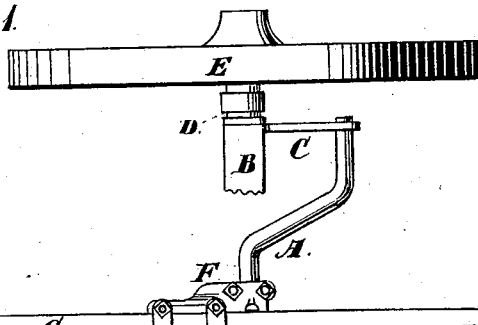
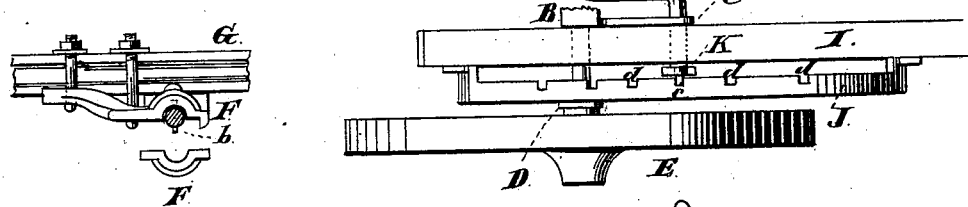
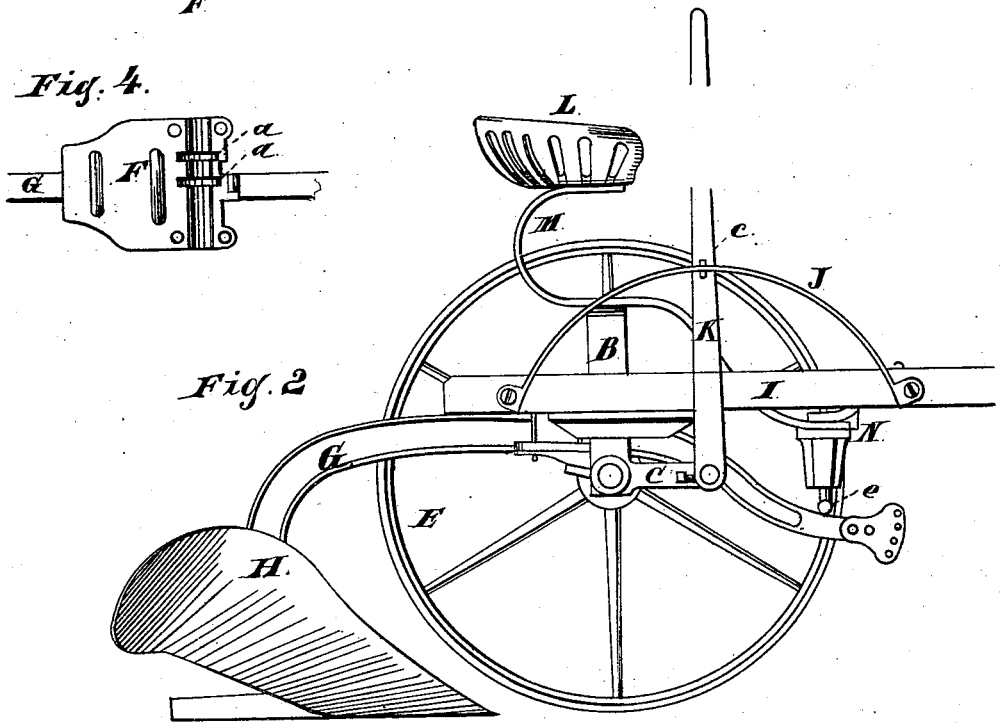
Witnesses:
Heinr. F. Bruns
A. W. Boud
Inventor:
Charles A. Hague

UNITED STATES PATENT OFFICE.

CHARLES A. HAGUE, OF CHICAGO, ILLINOIS, ASSIGNOR TO FURST & BRADLEY MANUFACTURING COMPANY, OF SAME PLACE.

SULKY-PLOW.

SPECIFICATION forming part of Letters Patent No. 243,125, dated June 21, 1881.

Application filed October 13, 1879.

*To all whom it may concern:*

Be it known that I, CHARLES A. HAGUE, residing at Chicago, in the county of Cook and State of Illinois, and a citizen of the United States, have invented a new and useful Improvement in Sulky-Plows, of which the following is a full description, reference being had to the accompanying drawings, in which—

Figure 1 is a top or plan view; Fig. 2, a side elevation. Figs. 3 and 4 are detail views of the beam socket or coupling.

This invention relates to sulky-plows which have a crank or bail carrying a plow pivotally connected thereto, and a frame or arch mounted on wheels and carrying a tongue and the plow crank or bail, the crank or bail being connected with the frame or arch, so that it can be raised or lowered for the purpose of adjusting the plow to run deeper or shallower, or for carrying the plow above the surface of the ground for transportation purposes, and when the plow is in the desired position the independent crank or bail can be locked so as to make the connection between it and the frame or arch practically rigid, holding the plow firmly and preventing any running in or out of the soil in the ordinary work of plowing, the movements of the independent crank or bail being controlled by a lever.

The objects of the invention are to maintain a uniform depth of cutting in hard or soft soil and prevent any vertical movements of the plow independent of the frame and wheels, and retain the same relative position of the crank or bail and the arch or frame in passing over elevations, depressions, or obstructions, and have the weight in all cases borne by the wheels to prevent any upward or downward pressure which may be exerted at the point where the plow-beam is pivoted or attached to the crank or bail from acting on the team, to allow the frame or arch a perfect freedom of movement on its spindle or supports, so as to conform to the surface of the ground without affecting the depth of the plowing, and to make the action of the plow more regular, steady, and uniform in all conditions of the soil; and its nature consists in suspending the plow-beam and supporting it on the crank or bail at points in the arc of a circle or line which passes through or near the center of the spindles or axial supports which support the arch or frame on the wheels, so that the center of motion for the plow will be practically coincident with the center of motion for the frame, and in supporting the crank in the frame at a point outside of or beyond the pivotal or turning point of the frame.

In the drawings, A represents the independent crank or bail; B, the frame or arch; C, the supports or arms carrying the crank or bail; D, the spindles or axles for the wheels; E, the wheels; F, the support or socket for the plow-beam; G, the plow-beam; H, the plow; I, the tongue or tongue-support; J, the rack; K, the hand-lever; L, the seat; M, the seat-support; N, the foot-rest for the driver or operator; *a*, the grooves in the head or bearing F; *b*, the pin or projection on the crank for engaging with the grooves *a* and preventing lateral movements of the plow-beam on the crank; *c*, the engaging-point on the hand-lever; *d*, the notches in the rack; *e*, the stop to limit the upward movement of the forward end of the plow-beam.

The crank or bail A, as shown, is made from a single piece so bent as to form a central or crank portion to receive and support the plow-beam, and end portions parallel with the central portion for supporting the crank or bail on the frame, so as to give the movements required for raising and lowering the plow-beam and plow.

The frame or arch B may be of any suitable construction that will give it an arch form. As shown, the upper or horizontal portion and the sides or vertical portions are formed from a single piece bent so as to leave a space between the sides or vertical portions for the movements of the crank and its connections.

The crank or bail B is supported, on the form of frame shown, in suitable bearings on the outer ends of forward-projecting arms or supports C, which arms extend out from the base or lower end of each side piece of the frame to a sufficient distance to carry the crank so that its central portion will swing or pass through an arc of a circle or line passing through or near the center of the axial supports for the frame.

The arms or supports C may be formed with the arch or frame, or they may be made separate and suitably secured thereto, and their length must be such as to furnish a bearing for the crank, to enable its movements to have the required relation to the frame-supports.

The wheels E may be of any of the well-known forms, and the frame or arch is supported on such wheels by suitable spindles on the lower end of each side or vertical piece of the frame or arch, located in line with the frame or arch.

The head or socket F for attaching the plow-beam to the crank is made in two sections, as shown, each section having in the lateral opening through which the crank passes transverse grooves $a$, to receive a pin or projections, $b$, passing through or projecting out from the crank, the object being to prevent any lateral movement of the plow-beam on the crank by the engagement of $b$ with one of the grooves $a$. Two or more grooves $a$ are provided, so as to change the position of the head or socket F, to permit different-sized plows to be used with the same crank and have the proper relation between the plow and the furrow-wheel maintained. This construction of socket F is very desirable for this purpose; but other forms of sockets or supports can be used, if desired.

The plow-beam G may be of any suitable and well-known form of construction, and is secured to its head or support F, in the usual manner, by tie-rods, bolts, or loops, so as to be held firmly, and carries the ordinary plow, H, attached thereto in any of the well-known methods, and, as shown, its forward end is formed with openings to attach a clevis.

The tongue or tongue-support I may be in the usual manner, and has its rear end attached, by bolts or otherwise, to the arch or frame, as shown. It is supported by a bracket formed on the side or vertical piece of the arch or frame.

The rack J is attached at its ends to the tongue or tongue-support I, so as to be, as shown, forward of the wheel-spindles, and has a series of notches, $d$.

The lever K is firmly attached at its lower end to the end of the crank A, and, as shown, extends up so as to be within reach of the driver, and has a catch or point, $c$, which engages with the notches $d$ of the rack and holds the lever in position. By moving this lever K forward or back the crank can be turned in its bearings so as to raise or lower the plow to any desired position, where it can be locked by engaging $c$ with one of the notches $d$, which engagement of the lever with the rack locks the frame or arch to the crank, destroying the pivot of the crank in the arms C and making the connection practically rigid, so that while the frame is free to turn on its axial supports, the point of the tongue will not be disturbed so as to throw the weight caused by any upward or downward movement or pressure of the plow at its pivot onto the team; but such weight will be carried by the wheels by reason of the pressure passing through or near the center of the spindles, which result is due to the manner of supporting the plow in its relation to such spindles or axial supports.

The seat L is supported on the horizontal portion of the arch or frame, as shown, by a support, M, which is carried forward, and has at its end an ordinary foot-rest, N, with a pin or stop, $e$, against which the end of the plow-beam can strike.

The various parts may be of other forms of construction than those shown; but the bail or crank must be so located and arranged that the point at which the plow-beam and plow are supported by the crank will be in the arc of a circle or line passing through or near the center of the axial supports, which feature constitutes the essential feature of my invention, and prevents any upward or downward movement of the plow, unless such movements are conveyed to the entire machine, so that the plow must run steady and uniform.

What I claim as new, and desire to secure by Letters Patent, is—

1. In a sulky-plow having a frame or arch, B, mounted on wheels and a single independent crank or bail, A, carrying a plow-beam, G, and a plow, a pivoted connection for the plow-beam to the crank, which will carry the beam in the arc of a circle on a line passing through or near the center of the axial supports for the frame or arch, substantially as described.

2. In a sulky-plow, the frame or arch B, horizontal supports or arms C, and crank or bail A, carrying the plow-beam G, in combination with the lever K, directly attached to one end of the crank or bail, substantially as specified.

3. In a sulky-plow, the combination of the arch or frame mounted on wheels, the tongue rigidly connected with the arch or frame, the crank having a connection with the plow-beam which carries the plow in the arc of a circle on a line passing through or near the center of the axial supports, the rack rigidly attached to one side of the tongue, and a hand-lever rigidly attached to the crank and arranged to engage the rack, all substantially as described, for the purpose set forth.

CHARLES A. HAGUE.

Witnesses:
O. W. BOND,
J. C. POLLEY, Jr.